United States Patent
Mitchell et al.

(10) Patent No.: US 11,372,685 B2
(45) Date of Patent: Jun. 28, 2022

(54) HASH-BASED ROUTING

(71) Applicant: Rapid7, Inc., Boston, MA (US)

(72) Inventors: Frank Mitchell, Pawtucket, RI (US); Andrew Thompson, Attleboro, MA (US)

(73) Assignee: Rapid7, Inc., Boston, MA (US)

( * ) Notice: Subject to any disclaimer, the term of this patent is extended or adjusted under 35 U.S.C. 154(b) by 249 days.

(21) Appl. No.: 15/901,541

(22) Filed: Feb. 21, 2018

(65) Prior Publication Data

US 2019/0258515 A1 Aug. 22, 2019

(51) Int. Cl.
*G06F 9/50* (2006.01)
*H04L 9/06* (2006.01)
*G06F 11/34* (2006.01)
*G06F 9/54* (2006.01)

(52) U.S. Cl.
CPC .............. *G06F 9/505* (2013.01); *G06F 9/546* (2013.01); *G06F 11/3476* (2013.01); *H04L 9/0643* (2013.01)

(58) Field of Classification Search
None
See application file for complete search history.

(56) References Cited

U.S. PATENT DOCUMENTS

| | | | | |
|---|---|---|---|---|
| 9,344,494 B2* | 5/2016 | Mordani | ................ | H04L 69/40 |
| 9,680,916 B2* | 6/2017 | Berk | .................. | H04L 45/7453 |
| 9,800,481 B1* | 10/2017 | Borlick | .................. | H04L 43/10 |
| 10,621,048 B1* | 4/2020 | Mudgal | ............... | G06F 11/1451 |
| 2006/0224699 A1* | 10/2006 | Kruse | ................. | H04L 67/2819 |
| | | | | 709/219 |
| 2009/0133025 A1* | 5/2009 | Malhotra | ......... | H04N 21/44222 |
| | | | | 718/102 |
| 2015/0350188 A1* | 12/2015 | Gilpin | .................. | H04L 63/083 |
| | | | | 726/9 |
| 2016/0048868 A1* | 2/2016 | Mirisola | ............ | G06Q 30/0245 |
| | | | | 705/14.44 |
| 2017/0076012 A1* | 3/2017 | Sreenivasa | ........ | G06F 16/90335 |

* cited by examiner

*Primary Examiner* — Lewis A Bullock, Jr.
*Assistant Examiner* — Melissa A Headly
(74) *Attorney, Agent, or Firm* — Ashwin Anand

(57) ABSTRACT

Routing log-based information by generating a log entry at a production server, computing an identifier for a logging server, and transmitting the log entry from the production server to the identified logging server. A hash-based routing system for storing and retrieving log-based information. A production server for generating and transmitting a log entry from a production server to a logging server.

16 Claims, 4 Drawing Sheets

HASH-BASED ROUTING

TECHNICAL FIELD

Embodiments of the invention relate generally to the routing of log information and a system for routing the information, and more specifically to methods and systems for transmitting the log information directly from a production server to a selected logging server.

BACKGROUND

Distributed computing systems use logging systems to provide visibility into their performance, problems, and failures. A typical log processing pipeline transmits log entries from at least one server to a queue. After being received at the queue, the log entries are stored and later processed and analyzed. If this logging system is working properly, log entries from individual servers will arrive at the queue in sequential order and any delay between receipt and storage will be negligible. The depth of a queue can indicate whether individual log entries are being received and stored in a timely manner.

Logging systems can fail due to spikes, i.e., surges in the number of log entries from a single server, and imbalances among traffic from different production servers. These imbalances can negatively impact the service by creating scenarios where log entries are dropped, log entries from individual servers arrive out of order, and log delay is not quantifiable. These scenarios often occur without user knowledge, resulting in an incomplete or delayed log which a user believes is otherwise complete and accurate.

Logging systems commonly use load balancers to protect against spikes in log traffic. Load balancers distribute incoming log entries into a plurality of queues to prevent any one queue from becoming overloaded. The distribution can be done in a round-robin fashion. Load balancing reduces the impact of a spike in log entries from a single server. However, load balancers have operational costs and can still result in scenarios where log entries are dropped without user knowledge. For example, a server that produces many log entries can still fill all the queues in a load balancer and block log entries from other servers. Because log entries from a server are split across queues, losing an entry results in the log for a server being incomplete. This failure may not be obvious to users because there will be no readily identifiable distinction between having the set of all log entries from a server and having only a portion of the log entries from a server. Logging pipelines can also protect against unexpected spikes in log traffic with rate limiters and random access storage.

A need exists, therefore, for methods and systems for processing log traffic that overcome the disadvantages of existing techniques.

SUMMARY

This summary is provided to introduce a selection of concepts in a simplified form that are further described below in the Detailed Description. This summary is not meant or intended to identify or exclude key features or essential features of the claimed subject matter, nor is it intended to be used as an aid in determining the scope of the claimed subject matter.

In one aspect, embodiments relate to a method of routing log-based information. The method includes generating at least one log entry at a production server; computing, at the production server, an identifier for a logging server using at least one property associated with the production server; and transmitting the log entry from the production server to the logging server identified by the computed identifier.

In one embodiment, the method further includes storing the log entry at the logging server. In further embodiments of the invention, the log entry is stored in a queue at the logging server.

In another embodiment, the method further includes retrieving the log entry from the logging server.

In another embodiment of the invention, computing the identifier comprises applying a hash function to the at least one property. In some embodiments of the invention, the hash function is selected from the group consisting of CRC32, MD5, and SHA256.

In another embodiment of the invention, the property associated with the production server is an instance identifier associated with a virtual machine implementing the production server.

In one embodiment, the identifier is computed for the production server when the production server is initialized.

In another embodiment of the invention, the log entry is transmitted from the production server to the logging server without utilizing a load balancer.

In yet another aspect, embodiments relate to a hash-based routing system for storing and retrieving log-based information comprising at least one production server with a hash-based routing module and at least one logging server having an identifier for enabling communications. In embodiments of the invention, the production server is configured to generate at least one log entry; compute an identifier for a logging server using at least one property associated with the production server; and transmit the log entry from the production server to the logging server identified by the computed identifier. In embodiments of the invention, the at least one logging server is configured to receive the at least one log entry and store the at least one log entry.

In some embodiments, the routing module computes the computed identifier using a hash function and applies the hash function to the at least one property. In further embodiments of the invention, the hash function is selected from the group consisting of CRC32, MD5, and SHA256.

In one embodiment, the routing system further comprises a second production server.

In an embodiment of the invention, the routing system further comprises a user interface that, when executed, displays the log entry after the at least one log entry is received by the at least one logging server.

In one embodiment, at least one property associated with the production server is an instance identifier associated with a virtual machine implementing the production server.

In one embodiment, the at least one log entry is stored in a queue at the logging server.

In one embodiment, the routing system does not include a load balancer.

In yet another aspect, embodiments relate to a production server configured to generate at least one log entry and transmit the log entry, comprising a persistent computer-readable program code that when executed by the production server causes the server to generate the log entry; a second persistent computer-readable program code that when executed by the production server causes the server to compute an identifier for a logging server using at least one property associated with the production server; and a third persistent computer readable program code that when executed by the production server causes the server to transmit the log entry to the logging server identified by the computed identifier.

In some embodiments of the invention, the server computes the computed identifier using a hash function and applies the hash function to the at least one property. In embodiments of the invention, the hash function is selected from the group consisting of CRC32, MD5, and SHA256.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
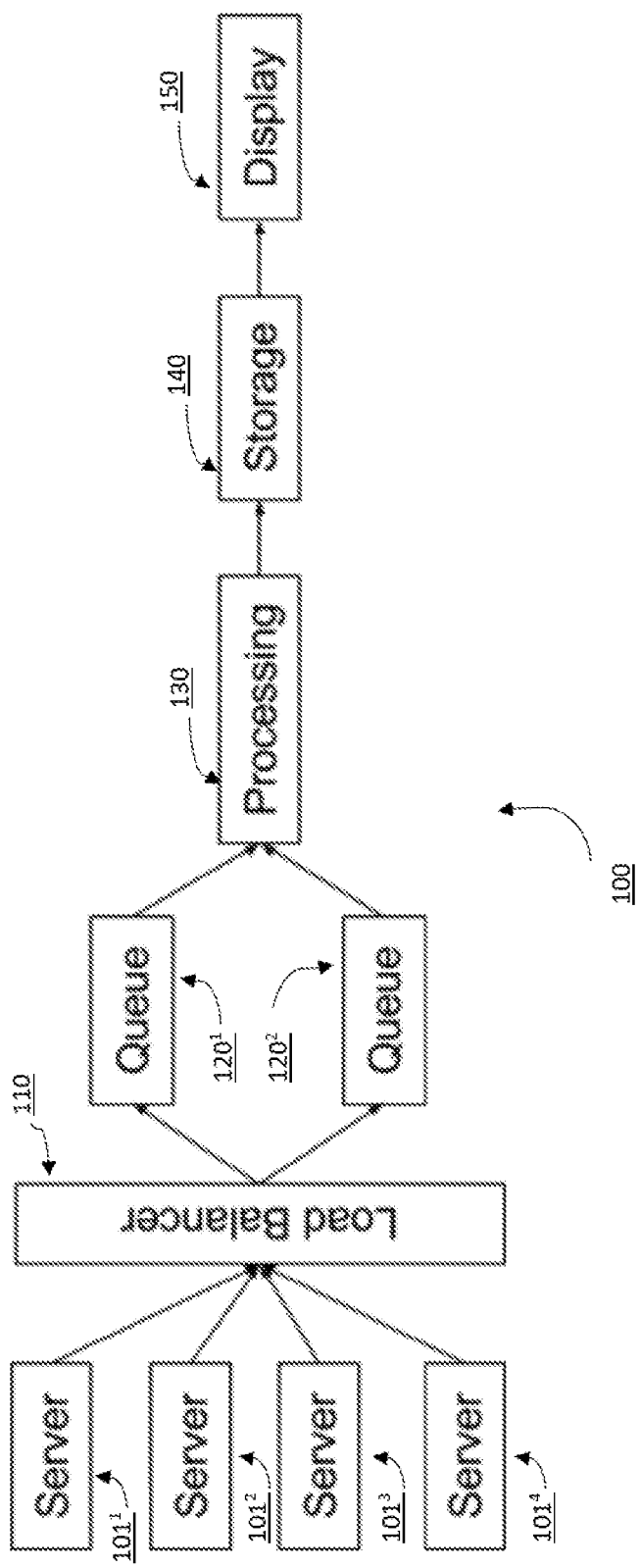
FIG. 1 depicts a flowchart of an existing log processing pipeline where multiple servers produce logs and a load balancer distributes logs to queues.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

Some portions of the description that follow are presented in terms of symbolic representations of operations on non-transient signals stored within a computer memory. These descriptions and representations are used by those skilled in the data processing arts to most effectively convey the substance of their work to others skilled in the art. Such operations typically require physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices. Portions of the present disclosure include processes and instructions that may be embodied in software, firmware or hardware, and when embodied in software, may be downloaded to reside on and be operated from different platforms used by a variety of operating systems.

The present disclosure also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each may be coupled to a computer system bus. Furthermore, the computers referred to in the specification may include a single processor or may be architectures employing multiple processor designs for increased computing capability.

The processes and displays presented herein are not inherently related to any particular computer or other apparatus. Various general-purpose systems may also be used with programs +in accordance with the teachings herein, or it may prove convenient to construct more specialized apparatus to perform one or more method steps. The structure for a variety of these systems is discussed in the description below. In addition, any particular programming language that is sufficient for achieving the techniques and implementations of the present disclosure may be used. A variety of programming languages may be used to implement the present disclosure as discussed herein.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Log processing systems are critical to the operation of a distributed computing services. Log processing systems provide visibility into the distributed system's performance, problems, and failures. To reduce problems and failures in log processing systems, load balancers are currently used to protect against spikes in log entry traffic.

As mentioned previously, existing log processing pipelines direct log entries from production servers to at least one queue. After being directed to a queue, the log entries are processed and then later, stored and made available to users in various forms. When the log pipeline operates correctly, log entries arrive at the queue in the order of their creation and the delay between receipt and storage is negligible. Reviewing the depth of the queue is one way to determine whether the queue is adequate for storing the log entries and, if not, how far behind in processing the log entries are.

Existing log processing pipelines, such as the system 100 shown in FIG. 1, can use load balancers and multiple queues to resolve transient increases in log entry traffic. In this configuration, at least one production server 101 will send log entries to one or more load balancers 110. If there are multiple servers 101$^1$, 101$^2$, 101$^3$, and 101$^4$ as shown in FIG. 1, the multiple servers will send all log entries to a load balancer 110. The load balancer 110 in turn distributes log entries to queues 120$^1$ and 120$^2$ reducing the possibility that any one queue 120 will become overwhelmed by log traffic and forced to discard or drop one or more log entries. The log entries may later be provided to a processing unit 130, a storage unit 140, and later made available to users via a display 150.

This architecture addresses increases in log entry traffic from servers with a load balancer 110. The load balancer 110 distributes log entries to queues 120, typically in a round-robin fashion. The load balancer 110 will direct log entries in the order it receives the entries from the production servers 101.

However, a significant increase in log entries from one or more production servers 101 may still overwhelm the plurality of queues 120$^1$, 120$^2$ or the load balancer itself. These log entries can fill all queues 120 and block or delay log processing for other production servers 101. Furthermore, there is no method to alert a user to this block or delay in log processing.

Because log entries from individual production servers 101 are divided across multiple queues 120, if a queue 120 malfunctions or discards log entries to cope with overload, the record of log entries from the servers 101 associated with the failed queue 120 will be incomplete. Losing a single queue 120 due to an overload or backlog in processing may result in a failure that is not obvious to users, as the existing pipeline employs no method to differentiate between a complete log with time gaps between its entries and a partial log that has time gaps due to processing failures or log entry discards.

Some log entries may be transmitted from one production server 101$^1$ through one queue 120$^2$ and other log entries from the same production server 101$^1$ may be transmitted through a different queue 120' due to the intended operation of the load balancer 110. If queue 120$^2$ malfunctions and queue 120' still functions properly, there may be no indication to the user that log entries routed by the load balancer 110 through queue 120$^2$ were lost or delayed in transit. Furthermore, the load balancer 110 creates additional operational overhead.

Other log processing pipelines use rate limiters and random access storage to protect against unexpected spikes in log entry traffic. These current solutions can result in undetectable out of order delivery of log entries, delays in log entry processing, and dropped log entries for related reasons.

Embodiments of the present invention, in contrast, use a routing system to shard log entries across queues. By introducing usable sampling into a logging pipeline, the failure of a queue is immediately apparent because of the complete absence of log entries from the servers associated with that queue. Embodiments of the present invention further ensure the delivery of log entries in order, such that the entries are processed in the order of oldest to newest generated log entry. Furthermore, the present invention enables automatic balancing without the use of a load balancer, such that the introduction of a new production server, logging server, or queue will not require moving data or the reconfiguration of existing machines. Overall, the present invention provides more reliable access to server log entries and logs.

Figure 2:
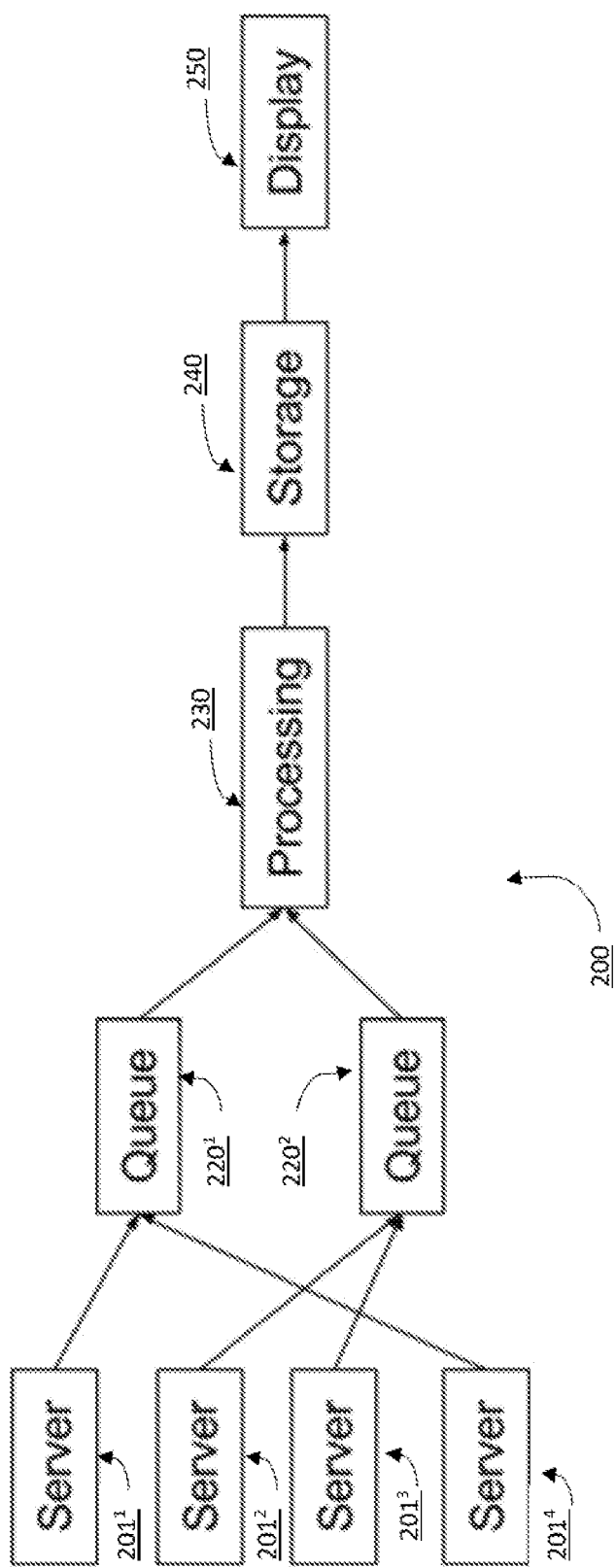
FIG. 2 depicts a log processing pipeline in accordance with one embodiment of the present invention.

FIG. 2 illustrates an improvement to the existing log processing pipelines of FIG. 1. FIG. 2 illustrates a hash-based routing system 200 for storing and retrieving log-based information. In an embodiment of the invention, at least one production server 201 generates a log entry and computes an identifier for a logging server (e.g., an IP address or shard identifier) using a property associated with the production server 201. In some embodiments of the invention, the log entry is transmitted to a queue 220 associated with the identified logging server. If there are multiple production servers, 201$^1$, 201$^2$, 201$^3$, and 201$^4$ as shown in FIG. 2, each production server will likely have one or more unique properties (e.g., MAC addresses, IP address, virtual server ID number, etc.) that will lead to the computation of an identifier for a logging server that will differ from the identifiers computed by one or more of its peer production servers 201. The log entries may later be processed 230, stored 240, and made available to users via an optional display 250 in accordance with certain embodiments of the invention. Log entries may be processed 230 and stored 240 at the logging server associated with the queue 220, or they may be processed 230, stored 240, and/or displayed 250 using one or more appropriately-configured computers.

The identifier computed by the production server 201 for the queue 220 may be determined by the application of a hashing algorithm to one or more properties associated with the production server 201. The hashing algorithm and/or the properties may be chosen so as to reduce collisions, i.e., the likelihood that individual production servers 201 will compute the same identifier for a queue 220 and thereby use the same queue. such that the routing system 200 may perform the method as shown in FIG. 3.

Figure 3:
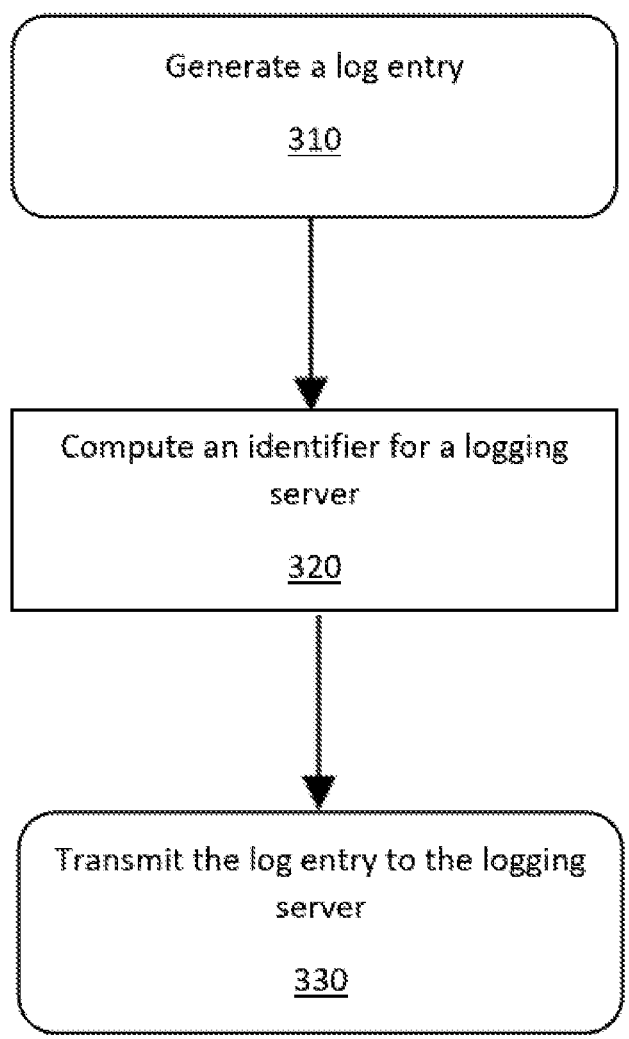
FIG. 3 is a flowchart of a method of routing log-based information in accordance with one embodiment of the present invention.

FIG. 3 is a flowchart of a method of routing log-based information, in accordance with one embodiment of the present invention. In an embodiment of the invention, a log entry is generated 310 at a production server. Then, in accordance with embodiments of the invention, an identifier for a logging server is computed 320. This computation uses at least one property associated with the production server and typically involves the application of a hashing algorithm to the at least one property to generate an IP address or shard identifier for the logging server. Later, the log entry is transmitted 330 from the production server to the logging server identified by the identifier computed previously 320.

In embodiments of the invention, the unique identifier will be calculated for each production server modulo the number of queues or logging servers 320. This creates a shard identifier. In embodiments of the invention, any algorithm for shard identifiers that creates static one-to-one mappings between production servers and queues associated with a logging server may be used.

In embodiments of the invention, shard identifiers are mapped one-to-one onto a queue associated with a logging server 320. This creates a unique production server to queue assignment for transmission of log entries 330. The shard identifier for a production server in accordance with embodiments of the invention is static. By creating a static shard identifier, retrieving and sampling log entries from a subset of queues will create a usable sampling effect. The sample log entries from a subset of queues will be an ordered collection of logs transmitted from a group of at least one production server. In some embodiments of the invention, multiple production servers generate multiple log entries.

In embodiments of the invention, the logging server is enabled to receive the log entries and, in further embodiments, the logging server may store the transmitted log entries for later processing and/or display. The computation step 320 may compute individual identifiers for each production server used in the method. The computation of the individual identifiers should result in a one-to-one mapping between production servers and logging servers that does not result in any one logging server receiving log entries from too many production servers. This reduces the burden of one logging server receiving log entries from production servers without the use of a load balancer. Thus, this eliminates the overhead costs associated with a load balancer while still maintaining a balanced procedure to process log entries from multiple production servers.

Some embodiments of the invention use a CRC32 hash of a static unique identifier for each production server. The CRC32 hash can provide an even, or relatively even, distribution of production servers to logging servers given a set of identifiers for the production servers. These production server identifiers in some embodiments are instance identifiers for a server in Amazon's EC2 environment. Alternative hashing algorithms, like MD5 or SHA256, may be used in other embodiments of the invention in place of CRC32.

In some embodiments of the invention, a spike in log entry traffic from a production server will only impact a single queue. If a queue malfunctions, log entries associated with the queue's shard identifier will still be useful because these log entries will represent complete logs from at least one production server. In embodiments of the invention, a single production server that produces multiple log entries will only fill one queue upon transmission 330. The processing of log entries generated 310 from other servers will not block transmission to the logging server 330 of those other log entries.

In some embodiments of the invention, shard identifiers are computed on the production server when the production server is initialized. Adding or removing production servers does not require changing the number of queues or the sharding algorithm. Since shard identifiers are static, the algorithm can be changed in different embodiments of the invention without changing which queues or logging servers existing production servers send log entries to. In embodiments of the invention, the algorithm can be updated to account for new queues and new logging servers by, e.g., changing the modulo value used in the computation of the shard identifier. Additionally, in embodiments of the invention, newly initialized production servers can send log entries to those new queues and logging servers without interrupting the transmission of the already created log entries. Likewise, the algorithm used to transmit log entries can be updated to remove queues or logging servers as needed by, e.g., changing the modulo value used in the computation of the shard identifier. In certain embodiments of the invention, newly initialized production servers can avoid sending log entries to an overloaded queue or logging server.

Figure 4:
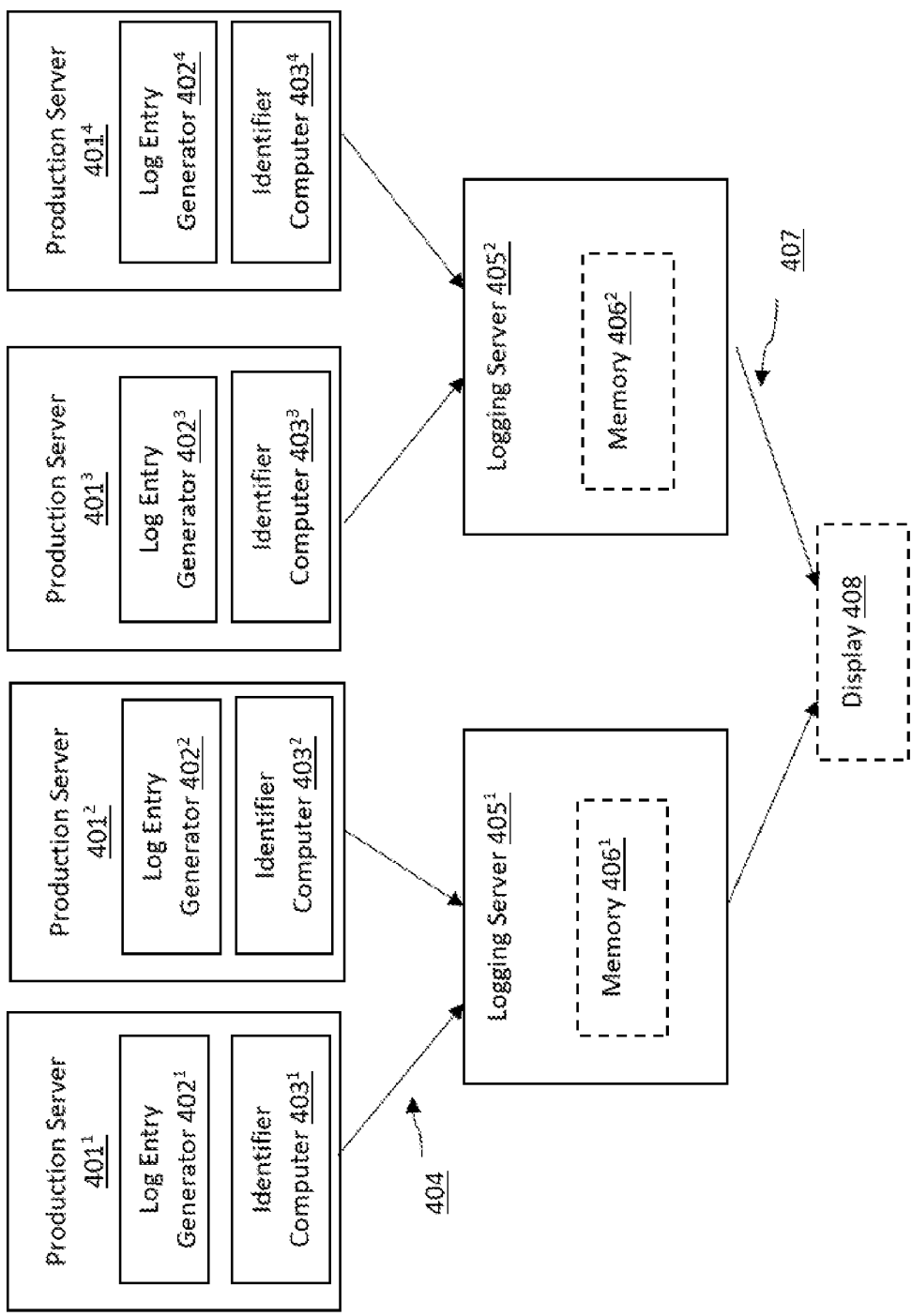
FIG. 4 depicts a routing system for storing and retrieving information, in accordance with one embodiment of the present invention.

FIG. 4 depicts a routing system for storing and retrieving information, in accordance with one embodiment of the present invention. In one embodiment of the present invention, a production server 401 transmits 404 at least one log entry to a logging server 405. The production server 401 houses a log entry generator 402 which creates log entries by means of a persistent computer-readable program code. The production server 401 also contains an identifier computer 403, which calculates a unique identifier for the production server 401 using a persistent computer-readable program code that uses at least one property associated with the production server. In one embodiment of the invention, the at least one property is an instance identifier associated with a virtual machine implementing the production server 401.

Some embodiments of the invention comprise multiple production servers $\mathbf{401}^1$, $\mathbf{401}^2$, $\mathbf{401}^3$, and $\mathbf{401}^4$ multiple log entry generators $\mathbf{402}^1$, $\mathbf{402}^2$, $\mathbf{402}^3$, $\mathbf{402}^4$ and multiple identifier computers $\mathbf{403}^1$, $\mathbf{403}^2$, $\mathbf{403}^3$, and $\mathbf{403}^4$ which compute unique identifiers for each production server $\mathbf{401}^1$, $\mathbf{401}^2$, $\mathbf{401}^3$, and $\mathbf{401}^4$ in accordance with the method depicted in FIG. 3.

In some embodiments of the invention, production servers $\mathbf{401}^1$, $\mathbf{401}^2$ may each transmit 404 at least one log entry to a logging server $\mathbf{405}^1$. Each transmitted log entry will be associated with a unique identifier for the originating production server $\mathbf{401}^1$, $\mathbf{401}^2$, such that if a user were to review the log, the user would be able to identify which log entry was transmitted from which production server $\mathbf{401}^1$, $\mathbf{401}^2$. In accordance with certain embodiments of the invention, the identifier computed by the production server may be determined by the application of a hashing algorithm to at least one property associated with the production server 401.

The routing system as depicted in FIG. 3 may be implemented in certain embodiments of the invention to reduce the likelihood that individual production servers $\mathbf{401}^1$, $\mathbf{401}^2$, $\mathbf{401}^3$, and $\mathbf{401}^4$ will compute the same identifier for a queue associated with a logging server 405 and thereby use the same queue at the same time.

In certain embodiments of the invention, the routing system allows for production servers $\mathbf{401}^1$, $\mathbf{401}^2$, $\mathbf{401}^3$, $\mathbf{401}^4$ to use different queues associated with different logging servers $\mathbf{405}^1$, $\mathbf{405}^2$ for transmission 404 of log entries.

In embodiments of the invention, an identifier computer 403 will calculate a unique identifier for a production server 401 modulo the number of queues or logging servers 405. Embodiments of the invention may employ one identifier computer 403 to calculate unique identifiers for all production servers 401. In other embodiments of the invention, multiple identifier computers $\mathbf{403}^1$, $\mathbf{403}^2$, $\mathbf{403}^3$, $\mathbf{403}^4$ may be used to calculate the unique identifier for a production server $\mathbf{401}^1$, $\mathbf{401}^2$, $\mathbf{401}^3$, $\mathbf{401}^4$. Each production server $\mathbf{401}^1$, $\mathbf{401}^2$, $\mathbf{401}^3$, $\mathbf{401}^4$ may house individual identifier computers $\mathbf{403}^1$, $\mathbf{403}^2$, $\mathbf{403}^3$, $\mathbf{403}^4$ in accordance with certain embodiments of the invention.

In embodiments of the invention, the calculated unique identifier will be static between one production server 401 and one logging server 405. The transmission 404 between the production server 401 and the logging server 405 does not change throughout a use of the routing system in accordance with embodiments of the invention. In certain embodiments, a new production server 401 or a new logging server 405 may be added during the use of the routing system. In some embodiments of the invention, if a logging server 405 is added to the routing system, the identifier computer 403 may compute a replacement identifier for a production server 401 such that it would transmit 404 log entries to the new logging server 405. In other embodiments of the invention, if a logging server 405 was removed from the routing system, the identifier computer 403 associated with a production server 401 originally transmitting to the now removed logging server 405 may compute a new identifier for the production server 401 such that it would transmit 404 log entries to a remaining logging server 405.

In embodiments of the invention, the user will be able to investigate and confirm that the routing system is properly operating by retrieving a log from the memory 406. In embodiments of the invention, a display 408 will show a log to the user wherein each log entry will be associated with an identifier for a production server 401. The hashing algorithm employed to ensure the log entry is transmitted 404 from the production server 401 to the logging server 405 minimizes collisions and ensures the log will contain all log entries from a production server 401 to a logging server 405. In some embodiments of the invention, if a production server 401 failed, the display 408 would not include any log entries from the production server 401 and the user would be able to identify such absence through an identifier associated with the other displayed log entries.

Though FIG. 4 displays four production servers $401^1$, $401^2$, $401^3$, $401^4$ and two logging servers $405^1$, $405^2$, the displayed number of logging servers 405 and 401 is not meant to be limiting. Certain embodiments of the invention can have any number of production servers 401 and logging servers 404. In accordance with certain embodiments of the invention, the larger the ratio of production servers 401 to logging servers 404, the greater likelihood of collisions in transmitting log entries to logging servers 404. The smaller the ratio of production servers 401 to logging servers 404, the lesser the likelihood of collisions in transmitting log entries to logging server 404.

In some embodiments of the invention, the production server 401 may execute a separate persistent computer-readable program code to transmit at least one log entry to the logging server 405 identified by the computed identifier. In some embodiments, the production server 401 computes the computed identifier using a hash function and applies the hash function to the unique identifier computed by the identifier computer 403, as discussed above. In embodiments of the invention, the hash function is selected from the group consisting of CRC32, MD5, and SHA256.

In some embodiments of the invention, at least one logging server 405 has memory 406 to store log entries transmitted from the production server 401. In some embodiments of the invention, the system has a separate memory $406^1$, $406^2$ associated with each logging server $405^1$, $405^2$. In accordance with other embodiments of the invention, one memory 406 is used to store log entries transmitted from every production server 401. In some embodiments, the memory 406 is housed in a logging server 405. In accordance with other embodiments of the invention, the memory 406 is located externally to both the logging servers 405 and the production servers 401. After at least one log entry is stored in the memory 406 of the logging server 405 or externally, a user may retrieve 407 the stored the at least one log entry and display 408 the at least one log entry. The log entries will be displayed 408 with the identifier computed by the identifier computer 403 associated with the production server 401.

In embodiments of the invention, these log entries will be displayed 408 in order of transmission, from first transmitted log entry to last transmitted log entry. The user may review the display 408 to determine if a queue associated with a logging server 405 has malfunctioned. In accordance with certain embodiments, the display 408 may show the unique computed identifier associated with the log entries from each production server 401, and at what point the log entries were routed from one logging server $405^2$ to another logging server $405^1$. In certain embodiments of the invention, the display 408 may also show if a production server 401 is not generating log entries, as a unique identifier associated with the malfunctioning production server 401 will not be present on the log.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of various implementations or techniques of the present disclosure. Also, a number of steps may be undertaken before, during, or after the above elements are considered.

Having been provided with the description and illustration of the present application, one skilled in the art may envision variations, modifications, and alternate embodiments falling within the general inventive concept discussed in this application that do not depart from the scope of the following claims.

What is claimed is:

1. A method of routing log-based information comprising:
   computing, at a production server and when the production server is initialized, an identifier by applying a hashing algorithm to at least one property of the production server, wherein the identifier is used to identify a shard of one of a plurality of logging servers to receive log entries from the production server, and wherein the at least one property of the production server is an instance identifier associated with a virtual machine implementing the production server;
   selecting the identified shard of the logging server of the plurality of logging servers to receive the log entries from the production server;
   generating a log entry at the production server;
   transmitting the log entry from the production server to the identified shard of the logging server;
   detecting an absence of the transmitted log entry at the identified shard; and
   detecting failure of the logging server based on the detected absence of the transmitted log entry;
   recomputing, at the production server, a new identifier for a shard of a second logging server of the plurality of logging servers in response to detecting the failure of the logging server; and
   transmitting new log entries from the production server to the shard of the second logging server.

2. The method of claim 1, further comprising storing the log entry at the logging server.

3. The method of claim 2, further comprising retrieving the log entry from the logging server.

4. The method of claim 1, wherein the hash function is selected from the group consisting of CRC32, MD5, and SHA256.

5. The method of claim 2, wherein the log entry is stored in a queue at the identified logging server.

6. The method of claim 1 wherein the log entry is transmitted from the production server to the logging server without utilizing a load balancer.

7. The method of claim 1, further comprising performing, by the production server:
   in response to a determination that a new logging server is added to the plurality of logging servers:
   computing another identifier using the hashing algorithm; and selecting another shard of one of the plurality of logging servers to receive log entries from the production server based on the other identifier.

8. The method of claim 1, further comprising performing, by the production server:
   in response to a determination that the logging server is removed from the plurality of logging servers:
   computing another identifier using the hashing algorithm; and
   selecting another shard of one of the plurality of logging servers to receive log entries from the production server based on the other identifier.

9. A hash-based routing system for storing and retrieving log-based information comprising:
   at least one production server with a processor executing instructions stored on memory and configured to:
   compute, when the production server is initialized, an identifier by applying a hashing algorithm to at least one property of the production server, wherein the identifier is used to identify a shard of one of a plurality of logging servers to receive log entries from the production server, and wherein the at least one property of the production server is an instance identifier associated with a virtual machine implementing the production server;
   select the identified shard of the logging server of the plurality of logging servers to receive the log entries from the production server; generate at least one log entry;
   transmit the log entry from the production server to the identified shard of the logging server;
   wherein the identified shard of the logging server is configured to receive the at least one log entry and store the at least one log entry and failure of the logging server is detected by an absence of the generated log entry;
   recompute, at the production server, a new identifier for a shard of a second logging server of the plurality of logging servers in response to detecting the failure of the logging server; and
   transmit new log entries from the production server to the shard of the second logging server.

10. The routing system of claim 9, wherein the hash function is selected from the group consisting of CRC32, MD5, and SHA256.

11. The routing system of claim 9, further comprising a second production server.

12. The routing system of claim 9, further comprising a user interface that, when executed, displays the log entry after the at least one log entry is received by the identified shard of the logging server.

13. The routing system of claim 9, wherein the at least one log entry is stored in a queue at the identified logging server.

14. The routing system of claim 9, wherein the routing system does not include a load balancer.

15. One or more non-transitory persistent computer-readable media storing program code that when executed on one or more processors of a production server cause the production server to:
   compute, when the production server is initialized, an identifier by applying a hashing algorithm to at least one property of the production server, wherein the identifier is used to identify a shard of one of a plurality of logging servers to receive log entries from the production server, and wherein the at least one property of the production server is an instance identifier associated with a virtual machine implementing the production server;
   select the identified shard of the logging server of the plurality of logging servers to receive the log entries from the production server;
   generate a log entry; and
   transmit the log entry to the identified shard of the logging server, wherein failure of the logging server is detected by an absence of the generated log entry at the identified shard;
   recompute, at the production server, a new identifier for a shard of a second logging server of the plurality of logging servers in response to detecting the failure of the logging server; and
   transmit new log entries from the production server to the shard of the second logging server.

16. One or more non-transitory computer-readable media of claim 15, wherein the hash function is selected from the group consisting of CRC32, MD5, and SHA256.

* * * * *